June 24, 1941.                R. M. SMITH                 2,247,317
                            PROTECTIVE RELAY
                         Filed Oct. 22, 1938          2 Sheets-Sheet 1

Differential Relay

WITNESSES:                                         INVENTOR
                                                   Roy M. Smith.
                                                   BY
                                                   ATTORNEY INVENTOR
Roy M. Smith.

Patented June 24, 1941

2,247,317

UNITED STATES PATENT OFFICE 2,247,317

PROTECTIVE RELAY

Roy M. Smith, Livingston, N. J., assignor to Westinghouse Electric & Manufacturing Company, East Pittsburgh, Pa., a corporation of Pennsylvania Application October 22, 1938, Serial No. 236,393

15 Claims. (Cl. 175—294)

This invention relates to protective arrangements for electrical systems, and it has particular relation to ratio or percentage differential relay protection for electrical apparatus, systems or networks having multiple terminals.

In electrical systems, it often is found desirable to protect apparatus or networks against damage or interruption caused by internal faults. For this purpose, ratio or percentage differential relays have been developed for protecting equipment such as generators or transformers. For example, a relay designed to protect a transformer against internal faults is provided with an operating winding energized in accordance with the difference between the current entering and leaving the transformer, suitable adjustments being made for any differences caused by the ratio of transformation. During normal operation, the difference between these currents would be substantially zero assuming that no error results from the equipment used for energizing the relay. When a fault occurs within the transformer, a substantial difference generally exists between the current entering and leaving the transformer through its terminals, and the operating winding of the relay is energized in accordance with this difference current.

In order to guard against faulty operation caused by irregularities in the equipment employed for energizing the relay, it is customary to provide restraint windings which are energized in accordance with the current entering and leaving the transformer. These restraint windings oppose operation of the relay in a degree dependent upon the current flowing through the transformer terminals. Thus, if for a given normal current flow through the transformer the operating winding is energized by a current of one ampere, if the normal current through the transformer increases 10-fold, the difference current through the operating winding would increase to 10 amperes, but because of the restraint windings the restraint also increases 10-fold and the relay consequently will not operate. In other words, the ratio of the operating current for the relay to the current flowing through the transformer may be held substantially constant by a suitable design of the restraint windings.

Differential relays of the type above referred to heretofore have been designed with three restraint windings and an operating winding, to protect fully, equipment having a maximum of 3 terminals (the term "terminal" here is employed for designating either a single-phase or a polyphase terminal). For protecting multiple-terminal systems or apparatus having a greater number of terminals, it is possible theoretically to increase the number of restraint windings employed in a relay, but from a practical standpoint, it is undesirable to increase the number of restraint elements above those now employed. Such an increase results in difficulties caused by the longer shafts required to carry a greater number of elements, by the increase in inertia of moving assemblies and by bearing troubles.

In accordance with my invention, multiple-terminal circuits wherein the number of terminals exceeds that protected adequately by existing relays, are provided with a plurality of ratio or percentage differential relay units, each unit similar to that heretofore employed in the art. The operating windings of all relay units are connected in series and energized in accordance with the difference between the total current entering the electrical system or apparatus and the total current leaving the system or apparatus through the terminals. Each of the restraint windings is energized in accordance with the current flowing through a separate one or separate ones of the terminals. By connecting the contact-making or control means of the relay units in series, it is possible to protect such a multiple terminal system or apparatus against all internal faults with substantially no possibility of faulty relay operation on external faults.

It is, therefore, an object of my invention to protect multiple-terminal circuits with simple protective equipment.

It is a further object of my invention to apply protective equipment designed for electrical systems having a limited number of terminals to systems having a greater number of terminals.

It is another object of my invention to expand the applicability of ratio-differential relays by connecting the operating windings of a plurality of such relays in series.

It is a still further object of my invention to increase the range of application of differential relays by connecting the contact-making or control means of a plurality of such relays in series.

Still another object of my invention is to provide a ratio-differential relay comprising a plurality of ratio-differential relay units having their operating windings connected in series and their contact-making or control means connected in series.

Other objects of my invention will be apparent from the following description taken in conjunction with the accompanying drawings, in which.

Figure 1:
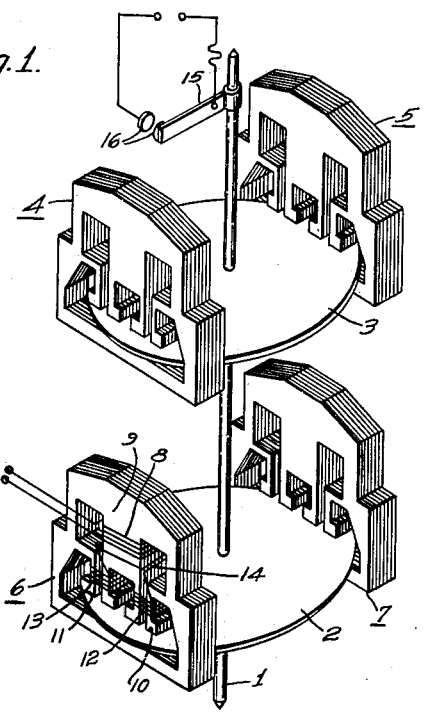
Figure 1 is a view in perspective of a ratio-differential relay.

Referring to the drawings, Fig. 1 shows a ratio-differential relay of the type commonly employed in the practice. This relay operates on the well-known induction principle and has a rotatable armature assembly comprising a shaft 1 and a pair of electro-conductive discs 2 and 3 which are attached to the shaft. A plurality of electromagnets 4, 5, 6 and 7 are provided for controlling the movement of the armature assembly. One of these electromagnets may be termed an operating electromagnet and is energized by an operating winding 8, which is wound on a main pole 9 of the electromagnet. The electromagnet also is provided with auxilary poles 10 and and 11 and auxiliary windings 12 and 13 on the auxiliary poles, which are energized from a coil 14 on the main pole 9. the coil 14, in turn, is energized by transformer action from the operating winding 8.

The armature assembly carries an arm 15 which is movable by the assembly to engage or separate a pair of contacts 16. The windings on the electromagnet 6 are designed to produce a shifting field, which by induction action rotates the armature assembly in contact-closing direction. Each of the electromagnets 4, 5 and 7 is provided with windings (not shown) which are similar to those illustrated on the electromagnet 6. The windings on the electromagnets 4, 5 and 7, however, are so arranged that when energized they tend to rotate the armature assembly in contact-separating direction, that is, these latter windings may be termed restraint windings.

Figure 2:
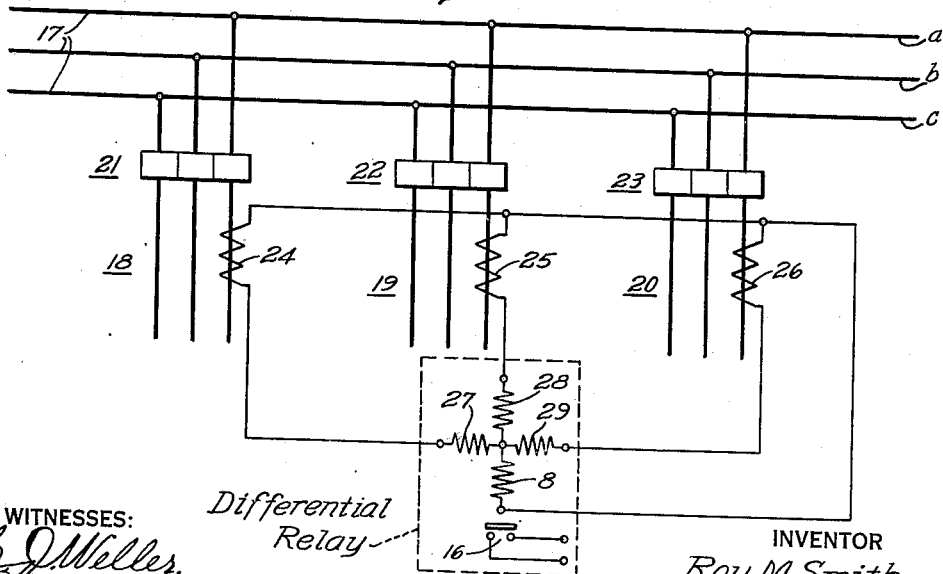
Fig. 2 is a diagrammatic view of a ratio-differential relay for protecting a three-terminal circuit.

If the terminals on an electrical apparatus or system do not exceed three in number, the relay illustrated in Fig. 1 may be employed for protecting the apparatus or system against internal faults. Such an application of the relay is illustrated in Fig. 2, wherein a three-phase bus 17 is provided for connecting three terminals 18, 19 and 20. In Fig. 2, the three phases are lettered a, b and c, respectively, and for simplicity, relay protection will be described for phase a alone.

In the specific embodiment shown in Fig. 2, circuit breakers 21, 22 and 23 are provided for connecting the terminals to the bus. For energizing the relay, phase a of each terminal is provided with a current transformer 24, 25 and 26, respectively, each transformer having one terminal connected to a restraint winding 27, 28 and 29 respectively. These restraint windings correspond to the windings employed on the electromagnets 4, 5 and 7 of Fig. 1. Upon reference to Fig. 2, it will be noted that each of the current transformer secondaries and its associated restraint winding, forms one arm of a parallel circuit. Across the parallel circuit, the operating winding 8 is connected.

Since the current entering the bus 17 must equal that leaving the bus through the terminals under normal operating conditions, it follows that under normal operating conditions the currents in the secondaries of the transformers 24, 25 and 26 must be substantially balanced and no current consequently, flows through the operating winding 8. This condition holds even though an external fault occurs on one of the terminals 18, 19 or 20. As a matter of fact, the currents in the secondaries of the transformers 24, 25 and 26 generally are not quite balanced because of dissimilarities or irregularities in the transformers themselves. However, any current flowing through the operating winding of the relay because of these dissimilarities or irregularities alone, is not sufficient to operate the relay as adjusted against the resistance of the restraint windings 27, 28 and 29. If a fault occurs on the bus, however, the current entering the bus through the terminals no longer equals that leaving the bus through the terminals and a condition of unbalance, therefore, exists in the currents flowing through the secondaries of the transformers 24, 25 and 26. The difference between these various currents flows through the operating winding 8 and actuates the contacts to their closed or engaged position against the resistance of the restraint windings.

It should be noted that correct operation of the relay obtains regardless of the particular nature of the terminals associated with the bus 17, that is, one of the terminals may be a source for supplying current to the bus and the remaining terminals feeders for supplying current from the bus. Two of the terminals may be sources for supplying current to the bus and one a feeder, or all of the terminals may be combined feeders and sources capable of supplying current to the bus or receiving current from the bus, as conditions warrant. In any case, correct operation of the relay assures satisfactory protection for the bus. Closure of the contacts 16 may be employed in any desired way, as for tripping the circuit breakers 21, 22 and 23, or for operating suitable operation indicators.

When terminals in excess of three are associated with an electrical system or apparatus, the protection afforded by the relay illustrated in Fig. 1 alone generally is inadequate. I have found it possible, however, to provide satisfactory protection by combining two or more relays of the type illustrated in Fig. 1. For example, in Fig. 3, I have illustrated a three-phase bus 30 having six terminals 31, 32, 33, 34, 35 and 36, connected thereto through circuit breakers 37, 38, 39, 40, 41 and 42. For protecting the bus 30 against internal faults, I provide two relay units 43 and 44, each similar to the relay shown in Fig. 1. Here again, for simplicity, protection is shown for only phase a of the bus.

Figure 3:
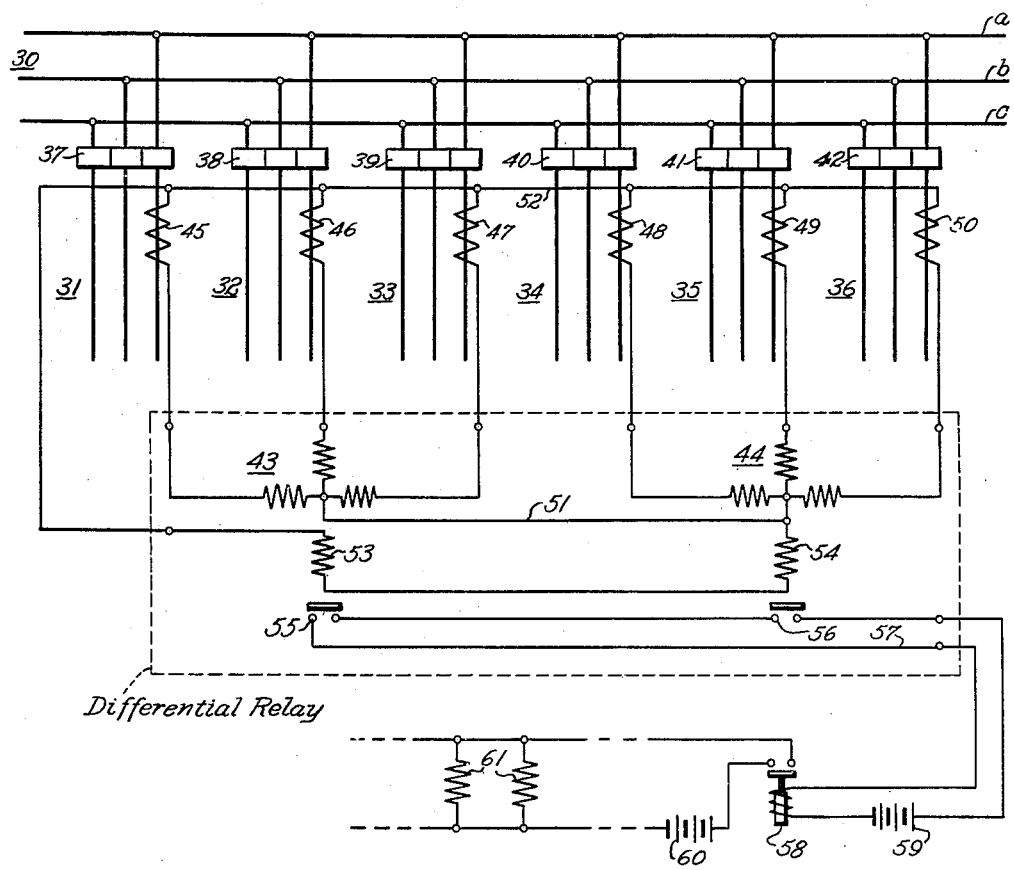
Fig. 3 is a diagrammatic view of a ratio-differential relay for protecting a six-terminal system; and, Fig. 4 is a fragmentary view of the system illustrated in Fig. 3 with the addition of a seventh terminal thereto.

Phase a of each terminal is provided with a current transformer 45, 46, 47, 48, 49 and 50, and the secondary of each of these current transformers is connected to one of the restraint windings of the relay units 43, 44 in a manner described with reference to Fig. 2. One terminal of each of the six restraint windings is connected to a common conductor 51 and the terminal of each secondary in Fig. 3 is connected to a common conductor 52, so that each current transformer secondary and its related restraint winding, forms one arm of a six-branch parallel circuit. The operating windings 53 and 54 of the relay units are connected in series across the parallel circuit formed by the current transformer secondaries and the restraint windings, and the contacts 55 and 56 of the relay units also are connected in series by suitable conductors 57.

It is believed that the operation of the relay shown in Fig. 3 will be apparent from the foregoing discussion. Since the current entering the bus 30 must equal that leaving the bus under normal operating conditions, and since the secondaries of the current transformers 45, 46, 47, 48, 49 and 50 are connected in parallel it follows that under normal operating conditions, no operating current will flow through the operating windings 53 and 54 of the relay units, disregarding the current flowing because of irregularities in the current transformers themselves. If, however, a fault occurs on the bus 30, the current entering the bus through the various terminals no longer equals that leaving the bus through the terminals, and a current corresponding to the difference between the currents entering and leaving the bus 30 through the terminals flows through the operating windings 53 and 54 to close the contacts 55 and 56. Closure of the contacts 55 and 56 may be employed for any desired control purposes. In the specific embodiment illustrated, these contacts are connected through the conductors 57 to a solenoid operated contactor 58, a suitable source of energy such as a battery 59 being included in the circuit. The contactor 58 when operated, in turn, may connect a suitable source of energy, such as a battery 60, across a plurality of coils 61 which may be employed for actuating operation indicators, or may be the trip coils of the circuit breakers 37, 38, 39, 40, 41 and 42. It will be noted again that protection is afforded regardless of the particular functions which the various terminals perform, that is, certain of the terminals may be bus ties, feeders, sources of energy or combinations thereof in any desired arrangement, without affecting the protection afforded by the relay.

Although the above discussion was under the assumption that all of the terminals are connected to the bus 30, it should be noted that protection is still afforded regardless of the condition of the terminals. That is, certain of the terminals may be disconnected from the bus without losing the protection offered by the differential relay. In any possible arrangement of the bus terminals, it will be found that one or more of the restraint windings of one or both relay units will carry a restraint current under normal operations, or under operations wherein an external fault occurs on one of the terminals.

If it is desired to protect electrical apparatus or systems having seven or more terminals, it is possible to add one or more relay units to the differential relay illustrated in Fig. 3, it being understood that the restraint windings of all relay units with their related transformers will be connected in the parallel arrangement above described, whereas the operating windings of the various relay units will be connected in series across a parallel circuit so obtained. Ordinarily, however, it will be possible to combine various terminals in excess of six so that only two relay units will be required. For example, in a bus having seven terminals, two of which cannot feed current back to the bus under any condition, current transformers for the two terminals may have their secondaries connected in parallel and the parallel combination may be employed for energizing one of the restraint windings of the relay illustrated in Fig. 3. If more than seven terminals are employed, other combinations may similarly be obtained, in certain cases, to avoid the necessity of adding other relay units to the differential relay. The parallel combination of transformer secondaries is illustrated more particularly in Fig. 4.

Figure 4:
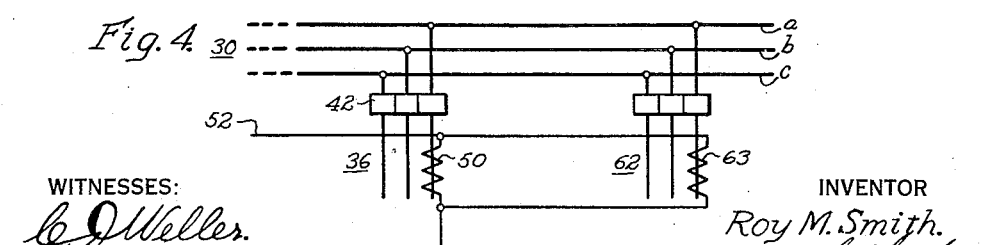

Referring to Fig. 4, a portion of the system of Fig. 3 is illustrated with the bus 30 having a seventh terminal 62 provided with a current transformer 63. If the terminals 36 and 62 both are feeders incapable of returning energy to the bus, the secondary of the transformer 63 may be connected in parallel to the secondary of the transformer 50, and proper relaying action will be assured. Similarly when still further terminals are added to the bus 30, other combinations of terminals ordinarily will be available. It is to be understood that Fig. 4 otherwise conforms to the bus, terminals and relay assembly shown in Fig. 3.

Carrying this procedure a step further, should the system of Fig. 2 have a fourth terminal added to the bus 17, the fourth terminal could have the secondary of its current transformer connected in parallel to the secondary of the transformer 26 if neither the fourth terminal nor the terminal 20 were capable of feeding current back to the bus 17. However, when a bus has a total of only four or five terminals, it is rare to find cases in which this parallel connection may be employed.

The necessity for exercising care in paralleling the transformer secondaries associated with two terminals will be apparent from a study of Fig. 4. For example, if only the two terminals 36, 62 are connected to the bus 30, and if the terminal 62 is capable of feeding energy back to the bus 30, an external fault on the terminal 36 would cause a heavy circulating current to flow through the secondaries of the transformers 50, 63. If these transformers be slightly unbalanced a difference current of sufficient magnitude to operate the relay may flow despite the fact that no internal fault has occurred. Consequently, as a rule, the relaying of multiple-terminal circuits cannot be solved merely by paralleling the secondaries of the transformers illustrated in Fig. 2 with secondaries associated with additional terminals.

Although I have described my invention with reference to certain apparatus, circuits and systems, it is apparent that my invention is susceptible to many modifications thereof. Therefore, I do not desire my invention to be restricted except as required by the appended claims when interpreted in view of the prior art.

I claim as my invention:

1. In a protective arrangement for an electrical system having a plurality of terminals, a relay comprising a plurality of operating means, means for energizing said operating means in accordance with currents flowing to faults occurring within said system, first restraint means disposed for coaction with a first one of said operating means, means for energizing said first restraint means in accordance with currents flowing through a first group of said terminals, second restraint means disposed for coaction with a second one of said operating means, means for energizing said second restraint means in accordance with currents flowing through a second group of said terminals, and control means responsive to the combined conditions of each of said operating means and its related restraint means.

2. In a protective arrangement for an electrical system having a plurality of terminals, a plurality of operating means, means for energizing said operating means in accordance with the difference between current entering and leaving said system through said terminals, a plurality of restraint means, means for energizing each of said restraint means in accordance with current flowing in a separate one of said terminals, said restraint means being arranged in groups, each group coacting with a separate one of said operating means, and control means responsive to the combined conditions of each of said operating means and its related restraint means.

3. In a protective arrangement for an electrical system having a plurality of terminals, a differential relay system comprising a plurality of operating means, means for energizing said operating means in accordance with currents flowing to faults occurring within said system, first restraint means disposed for coaction with a first one of said operating means, means for energizing said first restraint means in accordance with currents flowing through a first group of said terminals, second restraint means disposed for co-action with a second one of said operating means, means for energizing said second restraint means in accordance with currents flowing through a second group of said terminals, a control circuit including a control means responsive to the condition of said first one of said operating means and its related restraint means, a control means responsive to the condition of said second one of said operating means and its related restraint means, and trip means, said trip means being actuated only when all of said control means are in trip actuating condition.

4. In a protective arrangement for an electrical system having a plurality of terminals, a plurality of operating means, means for energizing said operating means in accordance with the difference between current entering and leaving said system, a plurality of restraint means, means for energizing each of said restraint means in accordance with current flowing in a separate one of said terminals, said restraint means being arranged in groups, each group coacting with a separate one of said operating means, a control circuit including a control means responsive to the condition of said first one of said operating means and its related restraint means, a control means responsive to the condition of said second one of said operating means and its related restraint means, and trip means, said trip means being actuated only when all of said control means are in trip actuating conditions.

5. In a protective arrangement for an electrical system provided with a plurality of terminals each having a separate current transformer associated therewith, a plurality of auxiliary circuits each including a secondary of a separate one of said current transformers and a restraint winding, said auxiliary circuits being connected in parallel, a plurality of operating windings, means connecting said operating windings in series with each other across said auxiliary circuits, a first control means controlled in accordance with the resultant condition of a first one of said operating windings and a first group of said restraint windings, and a second control means controlled in accordance with the resultant condition of a second one of said operating windings and a second group of said restraint windings.

6. In a protective arrangement for an electrical system provided with a plurality of terminals each having a separate current transformer associated therewith, a plurality of auxiliary circuits each including a secondary of a separate one of said current transformers and a restraint winding, said auxiliary circuits being connected in parallel, an additional terminal for said system, an additional current transformer for said additional terminal, said additional current transformer having its secondary connected in parallel with the secondary of one of said separate current transformers, a plurality of operating windings, means connecting said operating windings in series with each other across said auxiliary circuits, a first control means controlled in accordance with the resultant condition of a first one of said operating windings and a first group of said restraint windings, and a second control means controlled in accordance with the resultant condition of a second one of said operating windings and a second group of said restraint windings.

7. In a protective arrangement for an electrical system provided with a plurality of terminals each having a separate current transformer associated therewith, a plurality of auxiliary circuits each including a secondary of a separate one of said current transformers and a restraint winding, said auxiliary circuits being connected in parallel, a plurality of operating windings, means connecting said operating windings in series with each other across said auxiliary circuits, a first control means controlled in accordance with the resultant condition of a first one of said operating windings and a first group of said restraint windings, a second control means controlled in accordance with the resultant condition of a second one of said operating windings and a second group of said restraint windings, and trip means actuated by said control means, said trip means being actuated only when all of said control means are in trip actuating condition.

8. In a protective arrangement for an electrical system having electrical current entering and leaving said system through a plurality of terminals, a plurality of control means each operable into and out of a control condition, means responsive to currents flowing in a first group of said terminals for urging a first one of said control means into a predetermined first condition, means responsive to currents flowing in a second group of said terminals for urging a second one of said control means into a predetermined first condition, and means responsive to a function of all currents entering and leaving said system through said terminals for urging said first and second control means into predetermined second conditions.

9. In a protective arrangement for an electrical system having electrical current entering and leaving said system through a plurality of terminals, a plurality of control means each operable into and out of a control condition, means responsive to currents flowing in a first group of said terminals for urging a first one of said control means into a predetermined first condition, means responsive to currents flowing in a second group of said terminals for urging a second one of said control means into a predetermined first condition, means responsive to a function of all currents entering and leaving said system through said terminals for urging said first and second control means into predetermined second conditions, and controlled means responsive to said first and second control means only when said first and second control means both are actuated to predetermined conditions.

10. In a differential protective arrangement for an electrical system having electrical current normally entering and leaving said system through a plurality of terminals, first control means differentially resposive to current flowing through a first portion of said terminals and to current leaving said system by a path other than said terminals, and second control means differentially responsive to current flowing through a second portion of said terminals and to current leaving said system by a path other than said terminals.

11. In a differential protective arrangement for an electrical system having electrical current normally entering and leaving said system through a plurality of terminals, first control means differentially responsive to current flowing through a first portion of said terminals and to current leaving said system by a path other than said terminals, second control means differentially responsive to current flowing through a second portion of said terminals and to current leaving said system by a path other than said terminals, and controlled means responsive to the condition of said control means only when both of said control means are placed in predetermined conditions.

12. In a protective arrangement for a polyphase electrical system having a plurality of terminals through which currents normally enter and leave said system, protective means responsive only to faults occurring within said system including a separate current transformer for the same phase conductor of each of said terminals, said current transformers being connected in a parallel circuit having current components corresponding to currents entering said system normally substantially balancing current components corresponding to currents leaving said system through said terminals, a plurality of control means each operable into control conditions by the resultant of said current components in said parallel circuit, means responsive to currents flowing in a first portion of said terminals for opposing operation of a first one of said control means into its control condition, means responsive to currents flowing in a second portion of said terminals for opposing actuation of a second one of said control means into its control condition, and means controlled by said control means only when said first and second control means both are in their control conditions.

13. In a protective arrangement for an alternating current system having a plurality of terminals through which currents normally leave and enter said system, a plurality of differential relay units, each of said relay units having contact means and having restraint and operating windings for controlling said contact means, means for energizing the restraint windings of each of said relay units in accordance with current passing through a separate group of said terminals, and means for energizing each of said operating windings in accordance with the resultant of the currents flowing in all of said terminals, the contact means of said relay units being connected in series.

14. In a protective arrangement for an alternating current system having a plurality of terminals through which currents normally leave and enter said system, two of said terminals being incapable of supplying current to said system, a plurality of differential relay units, each of said relay units having contact means and having restraint and operating windings for controlling said contact means, means for energizing one of said restraint windings in accordance with currents flowing in said two terminals, means for energizing each of the remainder of said restraint wnidings in accordance with current passing through a separate one of the remaining terminals, and means for energizing each of said operating windings in accordance with the resultant of the currents flowing in all of said terminals, the contact means of said relay units being connected in series.

15. In a protective arrangement for an alternating current electrical system having a plurality of terminals through which currents normally enter and leave said system; a plurality of current transformers, one of said current transformers being associated with each of said terminals; a control device including a plurality of control units each having control means, operating means for operating said control means, and restraint means for opposing operation of said control means; means for connecting the restraint means of each of said control units for energization from a plurality of said current transformers in accordance with currents flowing through said terminals, a different grouping of said current transformers being provided for energizing the restraint means of each of said control units; means for energizing said operating means in accordance with the difference between currents entering and leaving said system through said terminal; and controlled means connected for actuation only when each of said control means is in a predetermined condition.

ROY M. SMITH.